May 5, 1953 M. C. PEASE 2,637,339
FLUID-FLOW REGULATOR
Filed Feb. 9, 1951 3 Sheets-Sheet 1

INVENTOR
MARSHALL C. PEASE

BY *H. W. Helvestine*
*George Sipkin*
ATTORNEYS

Patented May 5, 1953

2,637,339

UNITED STATES PATENT OFFICE 2,637,339

FLUID-FLOW REGULATOR

Marshall C. Pease, Needham, Mass., assignor to the United States of America as represented by the Secretary of the Navy Application February 9, 1951, Serial No. 210,131

8 Claims. (Cl. 137—501)

This invention relates to automatic liquid-flow regulator valves of the constant flow type and in particular to such a regulator which will maintain a substantially constant rate of liquid flow irrespective of fluctuation in pressure on the inlet side or in flow resistance on the outlet side.

The general object of the invention is to provide a liquid flow regulator which, after a manual setting of the control valves therein at a desired rate of flow, will automatically maintain that rate of flow at a substantially constant value.

It is also an object of the invention to provide a liquid-flow regulator which, after a setting of the control valves therein at a desired rate of flow, will automatically maintain that rate of flow at a substantially constant value irrespective of fluctuation in pressure on the inlet side or in flow resistance on the outlet side of said regulator.

It is an additional object of the invention to provide a liquid flow regulator which is of simple construction, is placed directly in the line of flow and functions automatically without pilot valve or other extraneous control.

Other objects will be apparent from the following description and from the drawings hereto appended which are merely illustrative of a preferred embodiment of the invention and are not otherwise limitative to the invention beyond the scope thereof as defined by the claims herewith submitted.

Flow regulators are known in the art which function to maintain the rate of flow at a substantially constant value. In general these prior art regulators are of rather complicated design and structure and depend for their control on one or more pilot valves positioned extraneously to the regulator and which control the valve setting in the regulator in response to pressure differentials along the line of flow. These pressure differentials may be determined as the difference in static pressure in the upstream and downstream side of an orifice in a plate placed in the line of flow, or they may be determined as the difference in the velocity pressure as determined in the throat of a Venturi tube positioned in the line of flow and the static pressure existing above or below the Venturi tube. In any case, the pressure differential may be used to control the setting of the flow valve in the regulator by the application of this variable pressure to one side of a flexible element such as a diaphragm or on one side of a movable piston both of which are directly connected to the control valve. The other side of the diaphragm or piston, in flow regulators of the prior art, may be biased by a calibrated spring to hold said valve in a predetermined position or the valve may be held in said predetermined position by the upstream fluid pressure exerted on the diaphragm or piston. Many combinations of pressure differential applications are possible and many variations in structure are known, such as balanced valve structure in which a pressure differential is applied across a double valve in such a manner as to vary the rate of discharge from a preset valve inversely with the increase in pressure on the inlet side and with the decrease in flow resistance on the inlet side.

This inventor controls flow of fluid by utilizing a regulator valve construction which is relatively simple and does not require a separate pilot valve to control the operation of the regulator valve for a relatively constant rate of delivery. The construction of the regulator and the arrangement of parts is shown in the accompanying drawings wherein.

Figure 1:
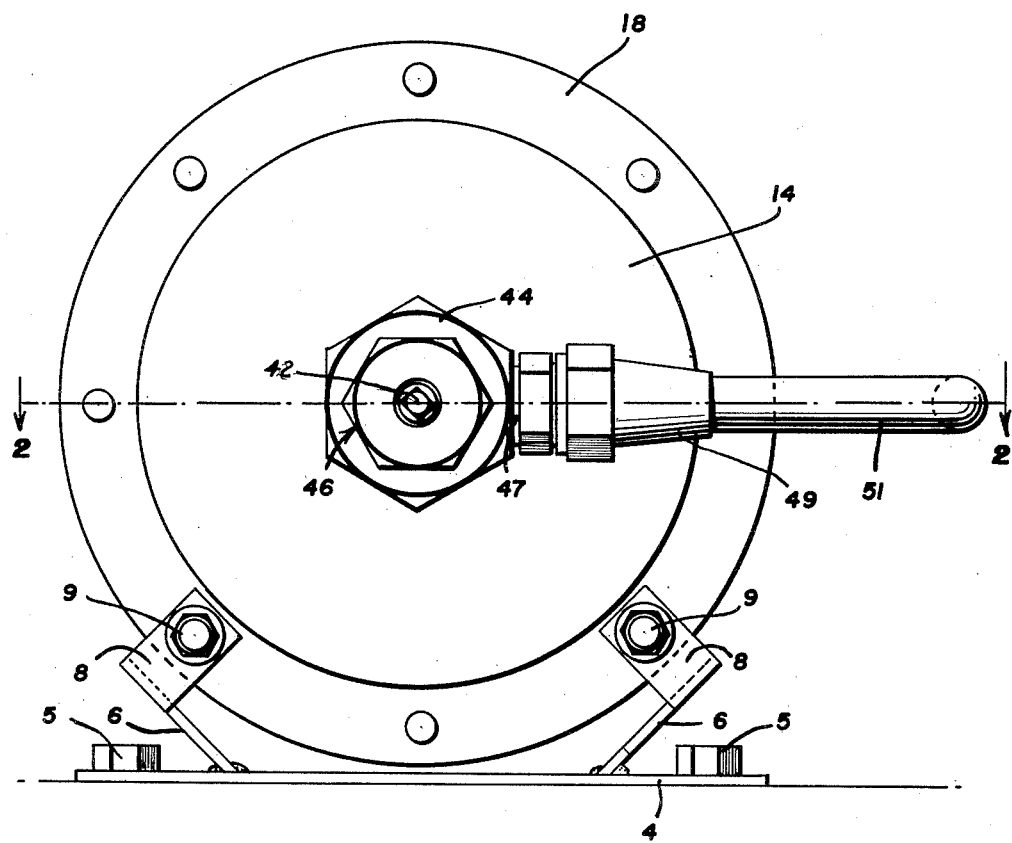
Fig. 1 is an end elevation showing the method of supporting the regulator on a base plate, and, Fig. 2 is a horizontal section taken along line 2—2 of Fig. 1, as viewed in the direction indicated by the arrows. It is partly in section and partly in elevation.

Referring to Fig. 1 of the drawings, this end elevation of the regulator valve shows one method of mounting the valve on a support for service operation. Here base plate 4 is anchored to a support by means of steel bolts 5. Plate 4 is provided with legs 6. These may be sections cut from the base plate and bent up at an angle to the plane thereof or they may be legs which are separate from the base plate but attached at an angle thereto by any means, such as welding. The free ends of these legs may be provided with clips 8 which are punched to receive bolts 9 which pass through flanges 16 and 18 on valve body parts 12 and 14. The axial positioning of valve stem 42, bonnet 44 and cap gland nut 46 is here shown. Discharge duct 51 is shown as connected to the outlet of bonnet 44 by means of coupling 49.

Figure 2:
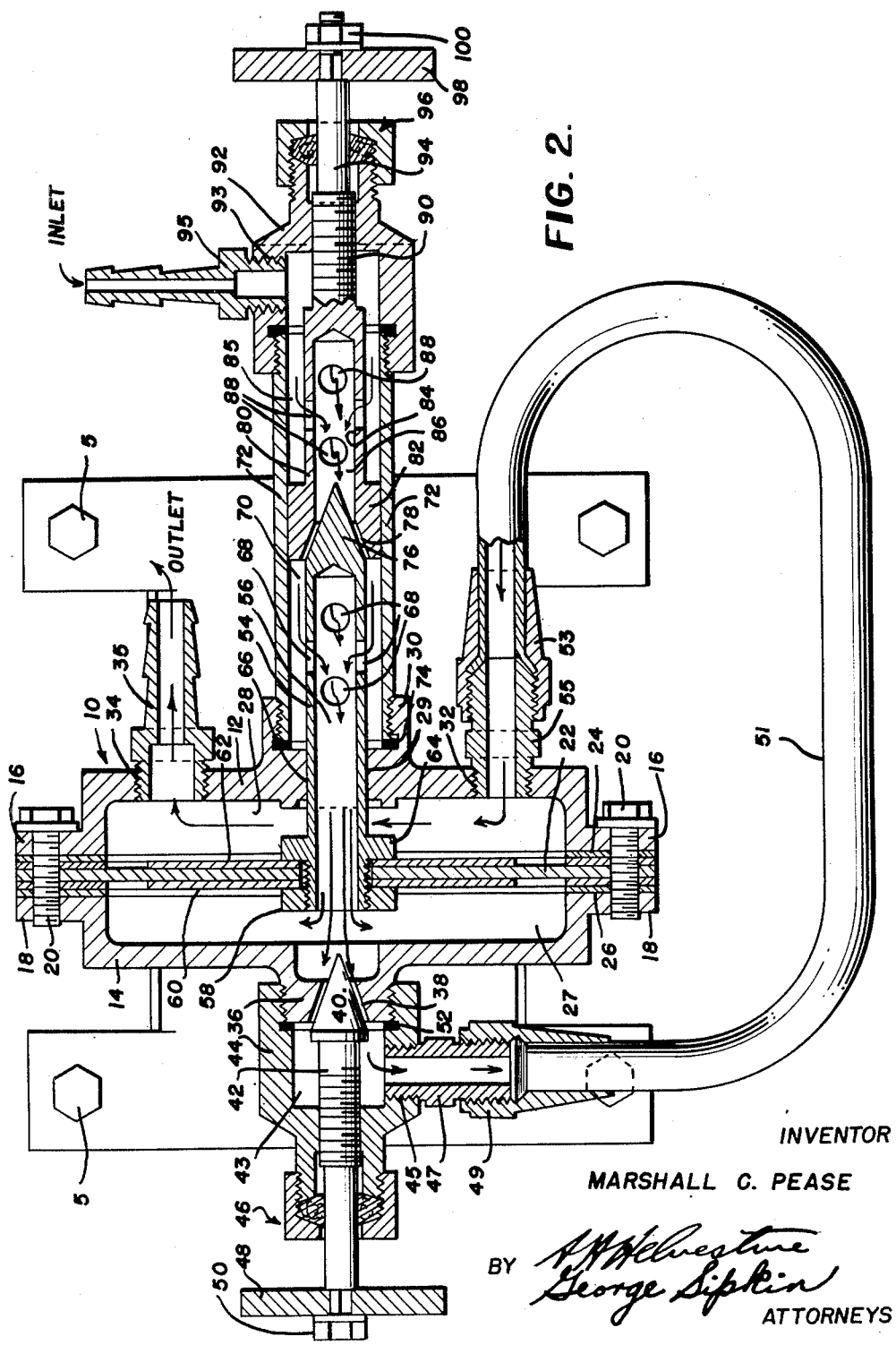
Figure 3:
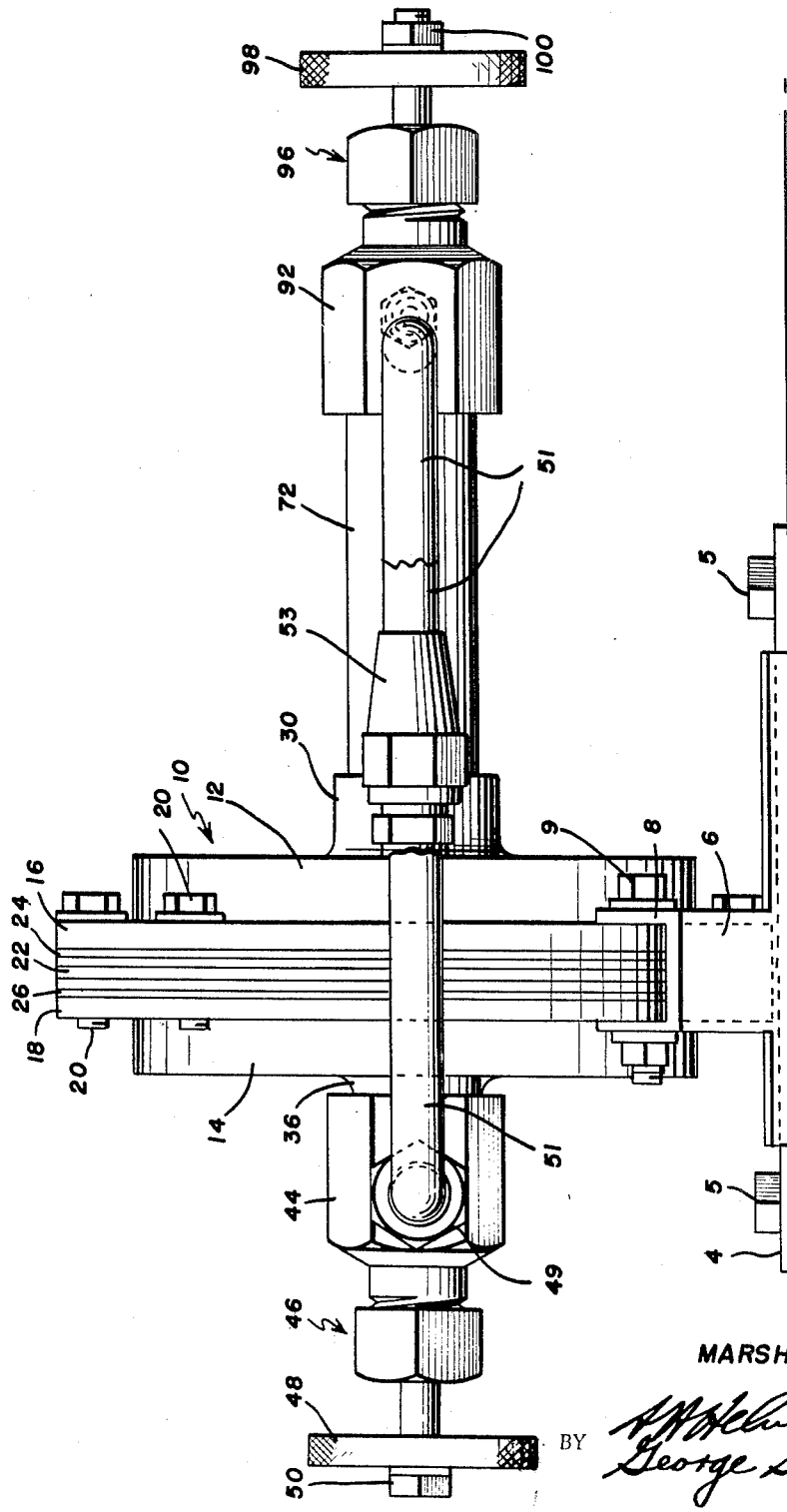
Fig. 3 is a side elevational view of the device.

With reference to Fig. 2 of the drawings the flow regulator, shown generally at 10, comprises a body divided into two concave parts 12 and 14. These parts are provided with matching integral annular flanges 16 and 18 respectively. Threaded stud bolts 20 pass through and engage these flanges, securely holding flexible diaphragm 22 between said flanges and gaskets 24 and 26. Diaphragm 22 thus divides the regulator body into two chambers, inlet chamber 27 and outlet chamber 28. Body part 12 is provided with an axially positioned port 29 around which and exteriorly of said part 12 an interiorly threaded boss 30 extends. Part 12 is also provided with interiorly threaded ports 32 and 34 which respectively serve as inlet and discharge ports to discharge chamber 28. Extending axially and exteriorly from part 14 is an exteriorly threaded boss 36. This boss is provided with an axially positioned port 38 which is frusto conical in cross-section and functions as a valve seat for plug valve 40.

This valve is mounted on a stem 42 which threadedly engages valve bonnet 44. Stem 42 extends out through gland 46 and is provided with hand operating wheel 48 which is securely attached to the end thereof as by locknut 50. Bonnet 44 engages the exterior threads on boss 36 and forms a tight seal therewith by means of gasket 52. Diaphragm 22 supports plug valve 54 perpendicularly at its center. Valve 54 is hollow being provided with a channel 56 therein which extends axially thereof from near the valve end through the other end, discharging into chamber 27. Valve 54 is securely held to diaphragm 22 by means of the clamping action exerted by nut 58 on the diaphragm and reinforcing discs 60 and 62 against flange 64 on valve 54. Valve 54 is also slidably supported in bearing 66 in central port 29. Movement of valve 54 through flexure of diaphragm 22 is therefore linear and along the perpendicular axis of the diaphragm. The forward part of channel 56 communicates through a plurality of ports 68 in the walls of valve 54 with the surrounding space 70, which is provided as a clearance between tubular member 72 and valve 54. Tube 72 threadedly engages the interior threads of boss 30 and is sealed with respect to said boss 30 by gasket 74. The forward end of valve 54 is conical in shape and constitutes a valve head or plug 76 which coacts with frusto conical valve seat 78 in movable valve seat member 80 which is slidably mounted in tube 72 to regulate the area of the opening around valve head 76.

Valve seat member 80 is of elongated construction. It comprises a head section 82 of such outside diameter as to form a sliding fit with the inside surface of tube 72, an intermediate section 84 of a lesser diameter than that of head section 82. Both sections 82 and 84 are machined out to provide conical valve seat 78 in section 82 and communicating axial channel 86 in section 84. A plurality of ports 88 in the walls of section 84 communicate between channel 86 and the surrounding space 85 which, in a manner similar to that of plug valve 54, is a clearance between this intermediate section 84 and the walls of tube 72. Valve seat member 80 is further reduced in diameter to provide an exteriorly threaded section 90 which is adapted to threadedly engage valve bonnet 92. Stem 94 is of further reduced diameter and extends from section 90 out through stuffing box 96 and is provided on its end with hand operating wheel 98 which is securely attached thereto by locknut 100. Thus it is seen that by the rotation of handwheel 98 valve seat 80 may be rotated and moved back and forth to increase or decrease the area of the orifice around valve plug head 76.

The movement of the valve seat 80 from one position to another establishes and maintains the flow of fluid through valve 76 within specified limits. The restriction formed by valve 76 limits the flow of fluid so as to control the differential pressure across the fixed seat valve 40. Valve bonnet 92 is provided with an interiorly threaded inlet port 93 which functions as the main inlet port for the valve and in which adapter bushing 95 threadedly engages. Valve bonnet 44 is provided with an interiorly threaded outlet port 45 in which nipple 47 threadedly engages. Tube 51 is securely attached to nipple 47 by means of coupling 49 which threadedly engages said nipple. The other end of tube 51 communicates with discharge chamber 28 through inlet port 32 being connected thereto by means of coupling 53 and bushing 55. Discharge from chamber 28 is to the service line through interiorly threaded discharge port 34 and adapter bushing 35 which threadedly engages said discharge port.

The line of flow through the valve after setting valve seat 80 and valve 40 for a predetermined rate of flow is from inlet port 93 into chamber space 85, through ports 88, into channel 86 through valve seat 78, into space 70, through ports 68, into channel 56, into chamber 27, around valve 40, into chamber 43, through outlet port 45, into tube 51, through inlet port 32, into chamber 28 and through outlet port 34 to the service line (not shown).

The operation of this flow-regulator valve is as follows: After externally adjusting valve seat member 80 and valve 40 to maintain the flow of liquid within the required limits, the rate of flow is dependent upon the pressure differential between chambers 27 and 28. If an external change occurs which increases the liquid supply pressure or decreases the resistance to liquid flow in the discharge system, the flow of liquid between chamber 27 and chamber 28 tends to increase. This in turn increases the difference in liquid pressure in chambers 27 and 28 and flexible diaphragm moves toward chamber 28 reducing the opening at valve seat 78. Should the liquid supply pressure decrease or the resistance to the flow of liquid in the discharge system increase, the flow of liquid from chamber 27 to chamber 28 tends to decrease, there is a corresponding reduction in pressure differential and valve 54 opens to allow a greater flow of liquid. Thus, valve seat 78 and valve 40 may be externally adjusted to obtain the desired rate of flow and the regulator will maintain a substantially constant rate of flow regardless of small changes in the supply pressure or resistance to flow in the discharge system.

This regulator valve is operative to maintain a substantially constant rate of flow of both gases and liquids.

It should be understood, of course, that the foregoing disclosure relates to only a preferred embodiment of the invention and that it is intended to cover all changes and modifications of the example of the invention herein chosen for the purposes of disclosure, which do not constitute departures from the spirit and scope of the invention as set forth in the appended claims.

What is claimed is:

1. A constant flow regulator valve for fluids comprising a hollow valve body provided with inlet and outlet ports, a tubular element threadedly engaging said valve body axially thereof and normal thereto, a bonnet cap threadedly engaging the end of said tubular element, said inlet port opening into said bonnet cap, a flexible diaphragm securely mounted in said valve body dividing said body into an inlet and a discharge chamber, said diaphragm responsive to pressure differential existing between said chambers, a hollow channeled plug valve securely attached to said diaphragm axially thereof and extending normal thereto through a first sidewall of said valve body in slidable relationship therewith and into said tubular element, the channeled interior of said plug valve communicating with said inlet chamber, said plug valve provided with a plurality of ports in its sidewalls communicating with its channeled interior and with the space between said tubular element and said plug valve, an interiorly channeled stemmed valve seat element slidably mounted in said tubular element and positionable therein with respect to said plug valve to regulate the area of the opening between said valve seat element and said plug, the channeled interior of said valve seat element communicating with the opening in said valve seat, said valve seat element provided with a plurality of ports in its sidewalls communicating with the channeled interior thereof and with the surrounding space between said valve seat element and the sidewalls of said tubular element, the stem of said valve seat element threadedly engaging a throat in said bonnet cap and extending exteriorly thereof, means mounted on the exterior end of said stem adapted by its rotation to position said valve seat with respect to said plug valve, a second valve seat communicating with a port positioned in a second sidewall of said valve body axially of said inlet chamber and in connection therewith, a second valve bonnet cap threadedly engaging the exterior surface of said second valve seat, a stemmed plug valve threadedly engaging the throat of said second bonnet cap and positionable with respect to said second valve seat, the stem of said plug valve extending exteriorly of said second bonnet cap, means securely attached to the exterior end of said stem adapted by rotation to position said second plug valve with respect to said second valve seat, conduit means communicating with the interior of said second bonnet cap and with said discharge chamber and means engaging said outlet port in said second sidewall of said valve body and discharge chamber for conducting fluid discharged by said regulator valve to a service line.

2. In a constant flow regulator valve for fluids the combination, in a valve structure provided with an inlet and outlet ports and a path of fluid flow therethrough from said inlet port to said outlet port, of a flexible diaphragm dividing said structure into an inlet and a discharge chamber, an interiorly channeled valve plug securely attached axially of and normal to said diaphragm and extending upstream into said path of flow, the interior channel in said valve plug communicating with said inlet chamber, an externally adjustable valve seat positioned upstream from said valve plug for regulating the rate of fluid flow past said valve, a fixed valve seat positioned in a port in the sidewall of said inlet chamber on the downstream side thereof, an externally adjustable valve plug coacting with said fixed valve seat, and conduit means communicating with said fixed valve seat and associated valve plug and with said discharge chamber for conducting fluid flowing through said fixed valve seat to said discharge chamber and thence out of said valve structure through said outlet port, whereby when said valves are set at a predetermined rate of flow and fluid under pressure flows along said path of flow a pressure differential is set up across said diaphragm and between said inlet and discharge chambers and whereby said diaphragm is responsive to variation in said pressure differential and moves said interiorly channeled valve plug with respect to said movable valve seat to maintain a substantially constant rate of fluid flow through said fixed valve seat and associated valve plug.

3. A constant flow regulator valve for fluids comprising a pair of valve body parts, a diaphragm dividing said body parts into a first chamber and a second chamber, a valve controlled outlet port in said first chamber, a valve controlled inlet to said first chamber, said valve controlled inlet comprising a hollow valve plug secured at one end to said diaphragm and terminating at its other end in a valve, a valve seat for said valve, and a tubular member attached to said second chamber and enclosing said valve and valve seat, an inlet in said second chamber, an outlet for said second chamber, and pipe means connecting said valve controlled outlet port with said inlet, whereby fluid in said first chamber flows through said second chamber in response to pressure variations existing in the outlet of said second chamber.

4. A constant flow regulator valve for fluids comprising a pair of valve body parts, a movable member dividing said body parts into a first chamber and a second chamber, a valve controlled outlet port in said first chamber, a hollow plug connected at one end to the central part of said movable member and extending outward laterally through said second chamber and the valve body part forming said second chamber, valve means controlling the supply of a fluid through said hollow plug into said first chamber, a discharge duct connecting said valve controlled outlet port in said first chamber with an inlet into said second chamber, and an outlet in said second chamber, whereby fluid delivered to said first chamber through said hollow plug is conveyed therefrom by said discharge duct to said second chamber for discharge through said second chamber outlet.

5. The combination according to claim 4 characterized by securing means securing said valve means controlling the supply of fluid to said first chamber to the other end of said hollow plug.

6. A constant flow regulator valve for fluids comprising a pair of valve body parts, a diaphragm dividing said body parts into a first chamber and a second chamber, an outlet port in said first chamber, a first valve controlling said outlet port, inlet means connected to said first chamber for conducting fluid thereto, said inlet means comprising a tubular member connected to the central part of said valve body part forming said second chamber, a hollow valve plug, means movably supporting said valve plug in said second chamber and in said tubular member, means connecting said valve plug at one end to said diaphragm and terminating at its other end in a second valve, an opening in the wall of said hollow valve plug thereby connecting said tubular member with said first chamber, a valve seat in said tubular member for said second valve, a second chamber inlet, a second chamber outlet, and a discharge duct connecting said outlet port in said first chamber with the second chamber inlet, whereby said second valve controls the amount of fluid supplied through said hollow valve plug to said first chamber according to pressure variations appearing in the second chamber outlet.

7. The combination according to claim 6 wherein the valve seat for said second valve is movable from one position to another.

8. The combination according to claim 6 further characterized by a valve seat stem connected to said valve seat, said stem comprising a hollow member having a plurality of ports therein, a hand-wheel connected to the end of said stem for manually adjusting said valve seat, a bonnet secured to the outer end of said tubular member enclosing said valve seat, a fluid supply inlet in said bonnet whereby fluid is supplied to said tubular member and valve stem prior to delivery past said valve seat to said first chamber.

MARSHALL C. PEASE.

No references cited.